Figure 1:
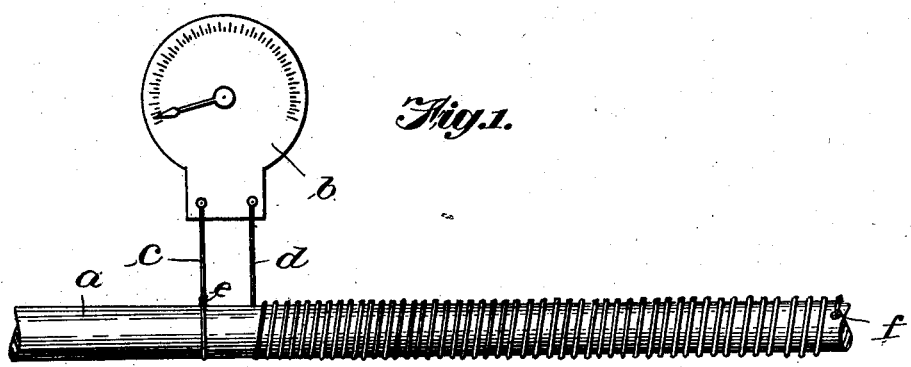

No. 720,335. PATENTED FEB. 10, 1903.
G. N. EASTMAN.
MEANS FOR MEASURING ELECTRIC CURRENTS.
APPLICATION FILED JUNE 20, 1902.

NO MODEL.

Witnesses:
O. M. Wunrich
J. C. Lee

Inventor:
George N. Eastman.
by A. Miller Reynolds
Attys.

UNITED STATES PATENT OFFICE.

GEORGE N. EASTMAN, OF CHICAGO, ILLINOIS, ASSIGNOR OF ONE-HALF TO EDWARD SCHILDHAUER, OF CHICAGO, ILLINOIS.

MEANS FOR MEASURING ELECTRIC CURRENTS.

SPECIFICATION forming part of Letters Patent No. 720,335, dated February 10, 1903.

Application filed June 20, 1902. Serial No. 112,499. (No model.)

*To all whom it may concern:*

Be it known that I, GEORGE N. EASTMAN, a citizen of the United States, residing at Chicago, in the county of Cook and State of Illinois, have invented a certain new and useful Improvement in Means for Measuring Electric Currents, (Case No. 1,) of which the following is a full, clear, concise, and exact description, reference being had to the accompanying drawings, forming a part of this specification.

My invention relates to means for measuring electric currents, and especially for measuring the enormous currents of modern lighting and power circuits; and its object is to provide a simple, practical, and inexpensive arrangement for compensating for the variation in resistance of the measuring instrument and the conductor carrying the current to be measured caused by variation in temperature.

In the arrangement herein set forth for carrying out my invention I provide a sensitive measuring instrument, preferably in the form of a sensitive potential measuring device, such as a millivoltmeter and provide also a compensating device which, with the measuring instrument, is connected in shunt with the conductor carrying the current to be measured. The compensating device is closely associated with the conductor carrying the current and has a very high resistance as compared with the resistance of the measuring instrument. The points in the conductor where connection with the instrument and compensating device is made are arranged suitably distant from one another in accordance with the capacity of the instrument and the resistance of the same and of the compensating device, these points being desirably as far apart as possible to secure greater accuracy. By this arrangement the compensating device, which is closely associated with the conductor, varies in temperature just as the conductor varies. In other words, the temperature of the two is always the same, and as a result the resistance of the conductor and compensating device will vary correspondingly. Variations in temperature will therefore not disturb the relative resistance between the compensating device and the conductor, and inasmuch as the resistance of the instrument is very small as compared with the resistance of the compenating device the error of the instrument is exceedingly small, so small as to be negligible for all practical purposes.

As a convenient arrangement the compensating device can consist of a coil or length of fine wire of either the same material as that of the conductor or a different material. It is desirably of such material as to have the same heat coefficient as the conductor.

I will explain more in detail this embodiment of my invention in connection with the accompanying drawings.

Figure 2:
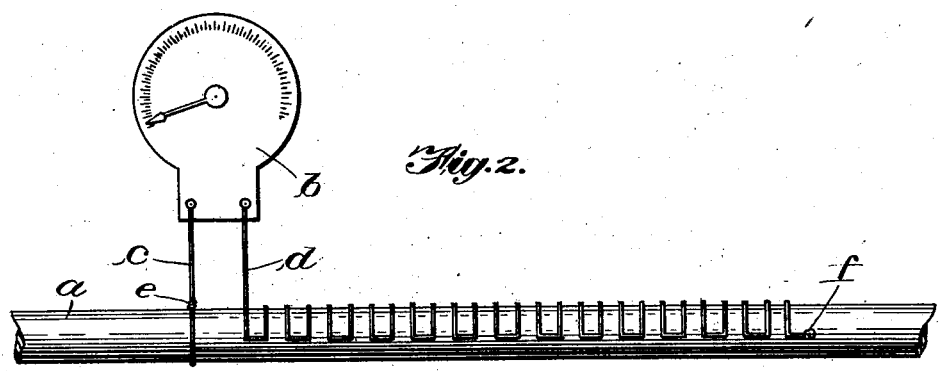
Figure 3:
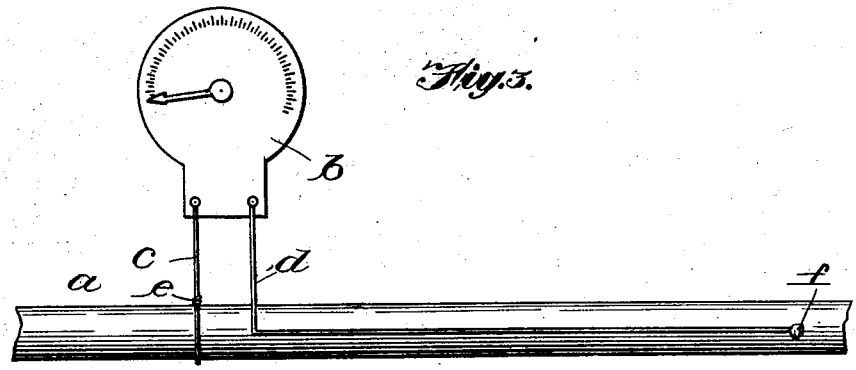

In the drawings Figure 1 is a view of a current-measuring system embodying my invention. Figs. 2 and 3 are views of modified forms of the same.

Referring to the arrangement shown in Fig. 1, $a$ is a conductor carrying the current to be measured. $b$ is a millivoltmeter having, for example, a capacity of fifty millivolts. The conductor $a$ and millivoltmeter $b$ are connected together by high-resistance wires or conductors $c$ and $d$, the wire $c$ being connected with the conductor $a$ at $e$ and the wire $d$ at $f$. The conductor $d$ is understood to be insulated and is wound about the conductor $a$, being in this manner closely associated with said conductor and forming a compensating device for compensating for variations in temperature. It will be understood that the conductor $d$ is desirably of very fine wire and of considerable length, so that it has a length much greater than the length indicated by the relative sizes in the drawing, and thereby affords a very considerable resistance.

In Fig. 2 the arrangement is substantially the same, except that the wire $d$ is wound non-inductively upon the conductor $a$.

In Fig. 3 the arrangement is also substantially the same, except that the conductor $d$ is shown as a single length of wire extending lengthwise of the conductor $a$.

By the arrangements above set forth it will be seen that the conductors $d\,d$ will by reason of their close association with the conductors $a$ vary in temperature as the conductors $a$ vary and that therefore there will be a corresponding variation in resistance of the compensating conductors $d\,d$ and conductors $a\,a$, with the result that the relative resistances of these conductors remain practically the same. The compensating conductors $dd$, having a resistance much greater than the resistance of the instruments $bb$, the error introduced by the latter is inconsiderable and may be disregarded for all practical purposes.

In practice the above arrangement operates with entire satisfaction. The following instance is submitted, the calculations being for a twelve-thousand-ampere direct-current ammeter. Full deflection of measuring instrument to indicate .05 volt, length of one generator-lead two hundred and thirty feet, size of lead nine million circular mills, resistance at 75° Fahrenheit, assuming conductivity of one hundred per cent., .0002685 ohm current-resistance drop at twelve thousand amperes 3.222 volts. Resistance of instrument when giving full-scale deflection equal 1.5 per cent. of total resistance of instrument-circuit.

With the above conditions it will be seen that the remainder of the resistance of the instrument-circuit—that is, the resistance of the compensating device—i. e., 98.5 per cent. of the resistance of the instrument-circuit—varies with variations in temperature in the same ratio as the resistance of the cable varies. Consequently 98.5 per cent. of the resistance of the instrument is to all intents and purposes not affected at all by changes in temperature, and the temperature error is therefore reduced to the 1.5 per cent. of the instrument-circuit. At 75° Fahrenheit the temperature coefficient for copper is .22 per cent. per degree. The temperature correction for the above arrangement would therefore be 1.5 per cent. of .22 per cent. per degree, or .0033 per cent., which is equivalent to a correction of one per cent. for every 333° Fahrenheit. This, it will be seen, is exceedingly small and can be disregarded for practical purposes.

It will be understood that where the compensating device consists of a high-resistance conductor this conductor can be associated with the conductor carrying the current in any desirable manner—such, for example, as the ways herein set forth or otherwise.

It will be seen that the variation of room temperature will have but little effect, that the arrangement is simple, inexpensive, and practical, and that there is but little loss of power.

Instead of the conductor $a$ it will be understood that the arrangement is applicable to a cable or other current-carrying device.

It will be understood that the invention can be carried out by devices and arrangements other than those herein set forth, and hence I do not wish to be limited to the precise constructions described herein.

What I claim is—

1. The combination with a conductor carrying the current to be measured, of a measuring device and a compensating device closely associated with the conductor, substantially as set forth.

2. The combination with the conductor carrying the current to be measured, of a measuring instrument, and a compensating device closely associated with the conductor and having a resistance greatly exceeding that of the instrument, substantially as set forth.

3. The combination with the conductor carrying the current to be measured, of a measuring instrument, and a compensating device closely associated with the conductor and having a resistance greatly exceeding that of the instrument, the compensating device and instrument being connected in series with one another and in shunt with the conductor, substantially as described.

4. The combination with the conductor carrying the current to be measured, of a potential-indicating instrument, and a high-resistance conductor forming a high-resistance shunt to the first-mentioned conductor, and including said instrument, said last-mentioned conductor being associated with the first-mentioned conductor, substantially as set forth.

5. The combination with the conductor carrying the current to be measured, of a potential-indicating instrument, and a high-resistance conductor forming a high-resistance shunt to the first-mentioned conductor, and including said instrument, said last-mentioned conductor being arranged upon the first-mentioned conductor, substantially as described.

6. The combination with the conductor carrying the current to be measured, of a high-resistance conductor forming a high-resistance shunt of the first-mentioned conductor, and including the potential-indicating instrument, the said second-mentioned conductor being wound non-inductively with respect to the first-mentioned conductor, substantially as described.

7. The combination of the conductor $a$, the millivoltmeter $b$, and the high-resistance wires $c$ and $d$ forming a high-resistance shunt to the conductor $a$ and connected with the millivoltmeter $b$ and with the conductor $a$ at separated points $e$ and $f$, substantially as described.

8. The combination with the conductor carrying the current to be measured, of a potential-indicating instrument, and a high-resistance conductor forming a high-resistance shunt to the first-mentioned conductor, and including the potential-indicating instrument, the resistance of the high-resistance conductor being relatively great as compared with that of the instrument, and said conductor being closely associated with the current-carrying conductor, substantially as described.

In witness whereof I hereunto subscribe my name this 17th day of June, A. D. 1902.

GEORGE N. EASTMAN.

Witnesses:
A. MILLER BELFIELD,
I. C. LEE.